United States Patent [19]
Mathur

[11] Patent Number: 5,823,467
[45] Date of Patent: Oct. 20, 1998

[54] PASSIVE DAMPING WEDGE

[75] Inventor: Gopal P. Mathur, Mission Viejo, Calif.

[73] Assignee: McDonnell Douglas Corp, Long Beach, Calif.

[21] Appl. No.: 831,532

[22] Filed: Apr. 1, 1997

[51] Int. Cl.[6] .................................. B64C 1/12; B64C 1/40
[52] U.S. Cl. ........................ 244/1 N; 244/119; 181/208
[58] Field of Search ..................... 244/1 N, 117 R, 244/119; 181/207, 208, 286; 292/343; 267/140, 153

[56] References Cited

U.S. PATENT DOCUMENTS

| | | | |
|---|---|---|---|
| D. 266,054 | 9/1982 | Goodman | 292/343 X |
| 804,585 | 11/1905 | Depue | 292/343 X |
| 2,254,152 | 8/1941 | Klemm | 244/119 |
| 2,581,625 | 1/1952 | Brady | 244/119 X |
| 3,071,217 | 1/1963 | Gould . | |
| 3,160,549 | 12/1964 | Caldwell et al. . | |
| 3,386,527 | 6/1968 | Baubert et al. | 181/208 |
| 3,472,472 | 10/1969 | Maestrello . | |
| 3,612,446 | 10/1971 | Lebert . | |
| 3,706,112 | 12/1972 | Newell | 292/343 X |
| 3,779,338 | 12/1973 | Hayden et al. . | |
| 3,976,269 | 8/1976 | Gupta | 244/119 |
| 4,482,592 | 11/1984 | Kramer . | |
| 4,534,526 | 8/1985 | Metzger et al. . | |
| 4,635,882 | 1/1987 | SenGupta et al. . | |
| 4,645,140 | 2/1987 | Bevilagua et al. . | |
| 4,706,910 | 11/1987 | Walsh et al. . | |
| 4,755,416 | 7/1988 | Schneider et al. . | |
| 4,828,202 | 5/1989 | Jacobs et al. | 244/117 R |
| 5,251,849 | 10/1993 | Torres | 244/117 R |
| 5,282,560 | 2/1994 | Ozog . | |
| 5,317,113 | 5/1994 | Duda . | |
| 5,340,054 | 8/1994 | Smith et al. . | |

OTHER PUBLICATIONS

Use of Turbulent Model to Calculate the Vibration and Radition Responses of a Panel, with Practical Suggestions for Reducing Sount Level, Sound Vib.(1967)5 (3), pp. 407–448, by L. Maestrello, The Boeing Company Doc. D6–9944.

*Primary Examiner*—William Grant
*Attorney, Agent, or Firm*—Donald E. Stout

[57] ABSTRACT

The passive damping wedge for reducing sound radiation from reinforced structures excited by fluid flow over the outer surface of the structure. The damping wedge is generally attached at the trailing edge of the skin structure on the inner surface. The unique three-dimensional design of the damping wedge provides increased damping which absorbs vibrational energy in the structure. The wedge is made of viscoelastic material with a high damping capacity to maximize the ability to reflect vibrations within. The wedge generally has an elongated base which extends upwards from a flat lower surface. An upper surface tapers downwards from the base into a plurality of spaced apart front end members which extend away from the base. The wedge also has a plurality of pairs of sides, with each pair of sides tapering inwardly to generally define each of the front end members.

20 Claims, 2 Drawing Sheets

PASSIVE DAMPING WEDGE

FIELD OF THE INVENTION

This invention relates generally to noise control and more particularly, to a passive noise control apparatus for reducing noise in the interior of an aircraft.

BACKGROUND OF THE INVENTION

Noise has been a significant negative factor associated with the commercial industry since its inception. In particular, acoustic radiation from vibrating fuselage panels of the aircraft is often reproduced as noise within the interior of the aircraft. This acoustic radiation is generally undesirable, and the noise generated almost always unpleasant for passengers as well as the crew.

In general, and broadly described, the exterior surface of an aircraft fuselage is excited or set into motion by the passing airflow including vibrations generated by the turbulent boundary layer. The aircraft skin is flexible and fluctuating pressure in the boundary layer causes the surface to flex and vibrate. This surface vibration acts as a radiator of sound. Further, the frame members bounding the vibrating skin panel provide the edge conditions for the vibration waves to be reflected and allow the vibrating skin panel to transfer vibrational energy into sound which is radiated into the interior of the aircraft.

In the typical conventional passive noise control approach for aircraft having a fuselage structures, a damping layer is applied across the surface of each skin panel. The skin panels being rectangular fuselage panels bounded by frame members and the longerons or stringers. This conventional damping member is designed to absorb the vibration energy by shear deformation in the damping material. A constraining layer may be added on top of the damping material to improve the energy absorption characteristics of the damping layer. Although the conventional damping member provided increased damping for resonant modes of a structure under mechanical or structure-borne excitation, it is known to reach a saturation level. In addition, it does not provide any benefit for structures under acoustic excitation, since non-resonant modes do not respond to damping treatments. Further, flow excitation is basically different from mechanical acoustic excitation acting on a structure.

U.S. Pat. No. 3,472,472, issued Oct. 14, 1969, to Al Mastrello, discloses a method and apparatus for minimizing vibration in a panel. However, the devices and methods disclosed do not increase the structural damping capacity for absorbing energy from the flextural waves incident of the panel edges. Further, the Mastrello patent requires use of a plurality of devices, one at each side of the panel. Thus, there is a need for an apparatus which can increase the structural damping capacity for absorbing energy from the flextural waves incident at the panel edges. There is also a need for a passive damping apparatus which provides gradual impedance matching with the frame bounding the panel.

Modern aircraft capable of high speeds, both subsonic and sonic, are still burdened with the problem of interior noise generated by the vibration of the outer fuselage panel. The next generation aircraft will likely comprise composite structures and materials which are lighter than the current aircraft structures. These modern aircraft will generate additional noise, enhancing the current problems.

The frequency vibrations of the flexing skin panels create noise which is generally difficult to eliminate, particularly using passive damping devices. Thus, there is a need for a passive noise minimizing apparatus which can be used to improve energy reduction in skin panels, including low frequency vibration and reduce noise in the interior of aircraft. There is also a need for such an apparatus that can be used at both subsonic and supersonic speeds. There is also a need for such an apparatus that is relatively simple to incorporate, generally lightweight, and inexpensive to manufacture.

SUMMARY

In accordance with this invention, sound radiation from reinforced skin structures excited by fluid flow over the outer surface by adding a damping apparatus at the trailing edge of each skin section or panel. The unique three-dimensional design of the damping apparatus or member, provides increased damping for absorbing vibrational energy of the vibrating structure. The damping apparatus of the present invention are shaped in three-dimensions, with increasing thickness in the base which is oriented toward the edge of the structure which is bounded by a stiffening or frame member. The damping apparatus is generally made from a viscoelastic material with a high damping capacity to maximize the energy absorbing effects.

In one broad aspect, a viscoelastic wedge is disclosed for absorbing flextural wave energy in a panel. In this embodiment, the viscoelastic wedge has an elongated base which extends upwardly from a flat lower surface. The wedge has an upper surface which tapers downwardly from the upper portion of the base into a plurality of spaced apart front end members. The wedge also has a plurality of pairs of sides, each pair generally tapering inwardly from a location adjacent to the base to generally define each of the front end members.

In another broad aspect of the present invention, an apparatus for absorbing flextural wave energy induced in a panel by flow excitation is disclosed. In this aspect, the panel generally has a first end supported by a first frame member and a second end supported by a second frame member. The apparatus comprises an elongated wedge which is attached to an inner surface of the panel. The wedge has a base which is aligned with and extends along the second frame member. The wedge has an upper surface which tapers downwardly from the base into a plurality of spaced apart front end members. Each of the members extends along the inner surface of the panel toward said first frame member.

In another embodiment of the present invention, a vehicle for high speed travel comprises a fuselage panel which has a first end and a second end is disclosed. The panel has an inner surface and an outer surface which is constructed for exposure to an exterior fluid flow. The first frame member supports the inner surface at the first end and the first frame member traverses the inner surface generally perpendicular to the longitudinal fluid flow. A second frame member supports the inner surface at the second end and the second frame member is spaced apart from the first frame member and traverses the inner surface generally parallel to the first frame member.

An elongated viscoelastic wedge is attached to the inner surface. The wedge has a base which is aligned with and extends along the second frame member. The wedge has an upper surface which tapers from the base downwardly into a plurality of spaced apart front end members. Each of the front end members extends along the inner surface towards the first frame member.

In another aspect of the present invention, the wedge comprises a flexible outer shell containing a viscous liquid. In yet another aspect the viscous liquid is a gel.

In yet another embodiment of the present invention, an aircraft for high speed travel comprising a fuselage panel having a first end and a second end is disclosed. The panel has an inner surface and an outer surface constructed for exposure to high speed longitudinal airflow. A first frame member supports the inner surface at the first end and traverses the inner surface in a direction generally perpendicular to the airflow. A second frame member spaced apart from the first frame member supports the inner surface at a second end and traverses the inner surface in a direction generally parallel to first frame member.

The aircraft also has a plurality of viscoelastic energy absorbing wedges for reducing noise. Each wedge has a base abutting and extending along the second frame member and tapers inwardly along a pair of sides into a front end. Each of the wedges also has an upper surface which tapers downwardly from the base to the front end. The front end extends outwardly from the base towards the first frame member along the inner surface in a direction generally parallel to longitudinal airflow.

The invention, together with additional features and advantages thereof, may be best understood by reference to the following drawing description.

DETAILED DESCRIPTION OF THE PREFERRED EMBODIMENT

Figure 1:
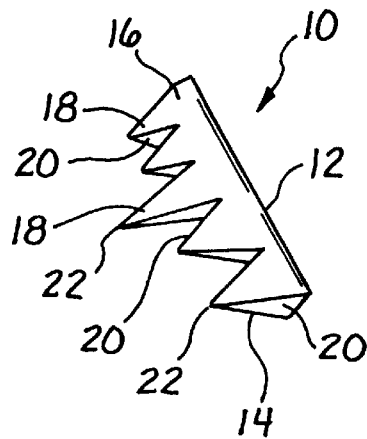
FIG. 1 is a perspective view of an energy absorbing wedge having the features of the present invention.

Referring to FIG. 1, an apparatus for absorbing flexural energy in panels having the features of the present invention is shown. The damping wedge 10 generally comprises an elongated base 12 which extends upwardly from a flat lower surface 14. The wedge 10 has an upper surface 16 which tapers downwardly from the upper part of the base 12 into a plurality of spaced apart front end members 18. Each of the front end members 18 has a pair of sides 20 which taper inwardly to each of the front end members 18. The pair of sides 20 generally define each of the front end members 18.

Figure 2A:
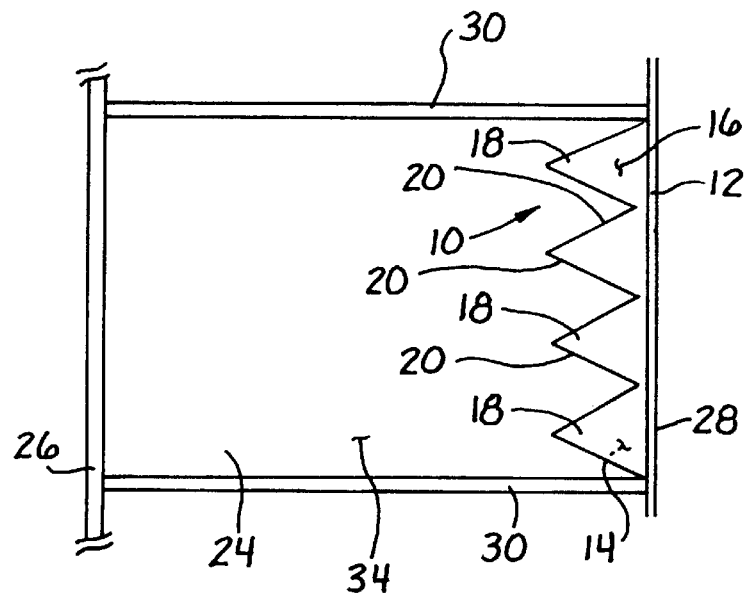
FIG. 2a is a side view of a panel showing a damping wedge of the present invention.
Figure 2B:
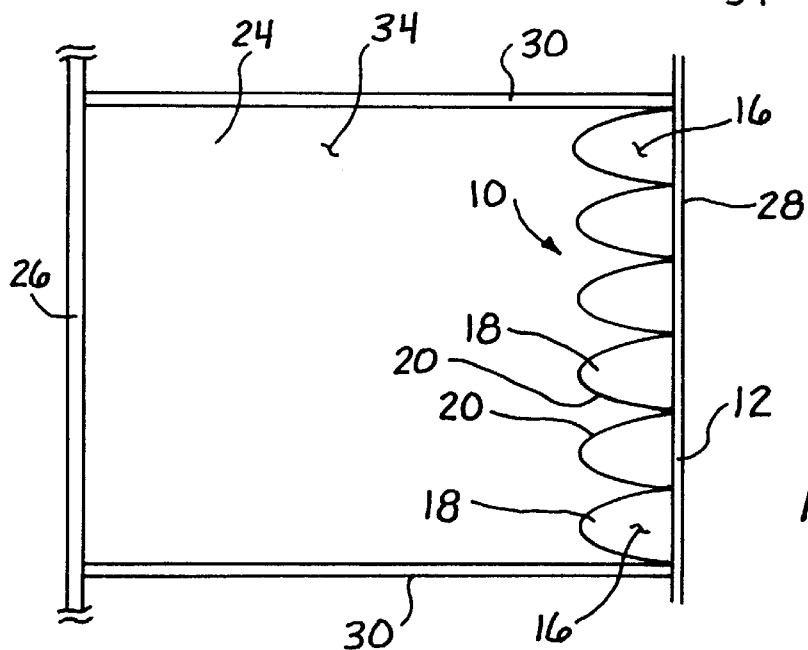
FIG. 2b is a wide view of a panel showing an alternative embodiment of the wedge of the present invention.

Referring now to FIG. 2a–2b, the wedge 10 is generally designed to absorb flexural energy in a plate or panel 24. The panel 24 may be a portion of a fuselage of a vehicle or aircraft, subject to a fluid flow. The panel 24 may also be a portion or section of a fuselage of an ocean-going vessel. Flexural wave energy or vibration is generated in such a panel 24 due to the fluid flow over the outer surface of the panel 24. This flexural wave energy carries along the panel 24 until a boundary is encountered. The energy then radiates from the bounded panel 24 into the vehicle. This energy is often radiated as noise. In particular, sound radiation into the fuselage of an aircraft is mainly due to the preferentially excited aerodynamically-coincident resonant modes that are set up due to energy reflections from panel boundaries. These panel boundaries generally include the frame members or ribs of the aircraft. Aerodynamic coincidence occurs when the convective wave member of the flow-field coincides with the flextural wave member of the panel 24. Such coincident conditions maximize energy transfer from the flow field to the structural mode, resulting in increased structural response. These flextural waves in the panel 24 are restrained by structural frame members and longerons or stringers, thus they are reflected at the edges of the panel 24 due to change and impedance conditions.

These flextural waves upon reflection from the trailing edge of a frame member radiate sound into the aircraft fuselage. The current invention, emphasizes creating anechoic end conditions at the panel trailing edge to minimize reflections. This is done by incorporating the wedge 10. The wedge 10 increases damping at the panel boundary.

The wedge 10 may have a different number of spaced apart front end members 18 for use with vehicles traveling at speeds greater than mach 1. The wedge 10 may be modified for applications where the excitation of lower wave number modes by the supersonic turbulent boundary layer pressure field is experienced.

For example, a fuselage panel 24 in a typical aircraft may have a first frame member 26 and a spaced apart second frame member 28. The first and second frame members 26 and 28 are generally perpendicular to the length of the aircraft. Longerons 30 are generally spaced apart along the aircraft and run generally parallel to each other. Thus, each panel 24 is defined by a frame member 26 which is forward in the longitudinal airflow, a second frame member 28 which trails and bounded on the opposing side by longerons 30. The panel 24 has an outer surface 32 for exposure to the longitudinal airflow or any airflow. The panel 24 also has an inner surface 34, the inner surface generally defining the interior of the vehicle. The panel 24 described is not limited to the fuselage of an aircraft, but may include the portion of the fuselage of any vessel, including ocean going vessels. The panel 24 described may also include any type of panel, including a flat plate experiencing a high-speed fluid flow.

A wedge 10 is generally placed on the inner surface 34 of the panel 24. The wedge 10 is placed such that the elongated base 12 is abutting and extending along the second frame member 28. The flat lower surface 14 is generally attached to the inner surface 34 of the plate 24. The plurality of spaced apart front end members 18 generally extend from the second frame member 28 to the first frame member 26. In this way, the spaced apart front end members 18 are facing into the direction of the fluid flow.

The wedge 10 may be attached to the inner surface 34 of the plate or panel 24 using an adhesive such as a contact cement. The elongated base 12 may also be attached to the second frame member 28 using such an adhesive or through the use of fasteners.

Generally each of the plurality of spaced apart front end members 18 is designed to absorb energy from the vibrating panel 24. The wedge 10 is also designed as an impedance member damping any vibration in the panel 24. This combination of energy absorbing and impedance effectively reduces the flextural wave energy in the panel 24. When the panel 24 is part of the fuselage of an aircraft, the wedge 10 acts to reduce noise in the interior cabin.

The length of the front end members 18 is generally designed to correspond to the wave length of the vibration desired to minimized. For the reduction of sound, for example sound in the interior of an aircraft, the front end members 18 may be designed such that their length corresponds to the wave length of the frequency of the sound desired to be minimized. Each individual front end member 18 may have a different length corresponding to the frequencies of vibration or sound desired to be minimized. In a preferred embodiment the length of the wedge 10 is approximately greater or equal than one half of the bending wave length of the noise desired to be minimized.

Each of the plurality of spaced apart front end members 18 may be of a differing shape. In general it is preferred that each of the spaced apart front end members generally has a similar shape and is only differing in the length. However, differing applications may require differing shapes for each of the front end members 18. In a preferred embodiment, a top view of the wedge 10 shows that each of the front end members may have a triangular shape. The triangular shape may have a fairly sharp front end 22. Alternatively, the front end 22 may be slightly rounded. Additionally, the interior angle between each of the triangular front end members 18 may be rounded providing a continuous sinusoidal wavelike wedge-edge.

Being of a triangular shape, each of the front end members is defined by a taper angle. This taper angle generally defines the inward angle from a longitudinal axis 38 of each triangle. The length of each of the front end members 18 in addition to this taper angle 36 generally defines the overall size of the wedge 10. This angle may be a large angle or a smaller angle depending upon the frequency desired to minimized. However, the taper angle 36 may preferably be between 10 and 25 degrees, and more preferably between approximately 17 and 19 degrees. For applications in commercial aircraft, a taper angle of approximately 18 degrees may be preferable for reducing interior noise found generally unpleasant.

In addition to the triangular shaped front end members 18, the upper surface 16 of each of the front end members 18 may define a semi-cone shape. This semi-cone shape generally provides a smooth continuous front end member.

In addition to the triangular shaped front end members 18, alternative configurations may be utilized. In one configuration, rounded front end members 18 may be utilized as shown in FIG. 2b.

Figure 3A:
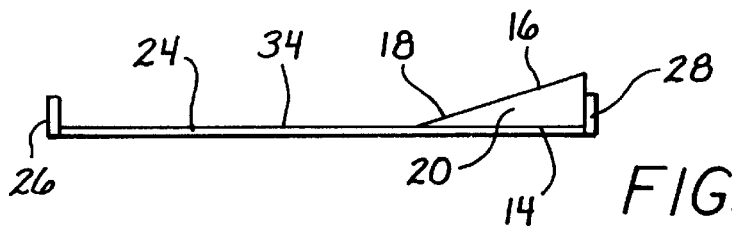
FIG. 3a is a cross-sectional view of a panel showing the damping wedge of the present invention abutting the second frame member.
Figure 3B:
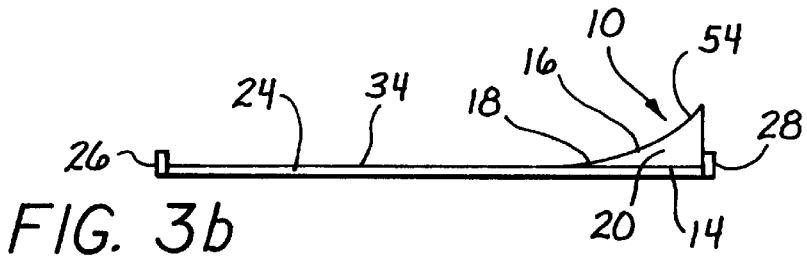
FIG. 3b is a cross-sectional view of a panel showing an alternative embodiment of a wedge of the present invention abutted against the second frame member.

Referring now to FIGS. 3a–3b, the wedge 10 is shown attached to a plate or panel 24. An elongated base 12 of the wedge 10 is shown abutted against the second frame member 28. The upper surface 16 tapers downwardly from the base 12 into a front end member 18. The upper surface 16 may have a straight taper or alternatively may have a curved taper. The curved taper may be a convex taper 52 or a concave taper 54. The alternative configurations of tapers may be useful depending upon the different frequencies of vibrations being minimized. In addition, the different configurations may be useful depending upon space available for the wedge 10 on the panel 24.

The wedge 10 may be made from any viscoelastic material which is capable of dampening vibrational energy in the panel 24 while additionally creating preferably impedance conditions for the vibration. In a preferred embodiment, the viscoelastic material is a viscoelastic polymer sold under the trademark SORBATHANE. Alternatively, the wedge 10 may be a flexible outer shell having a viscous fluid interior. The viscous fluid may be a gel. In addition, the viscous fluid may contain energy absorbing or impedance enhancing materials such as hard plastics or ceramics.

Figure 4:
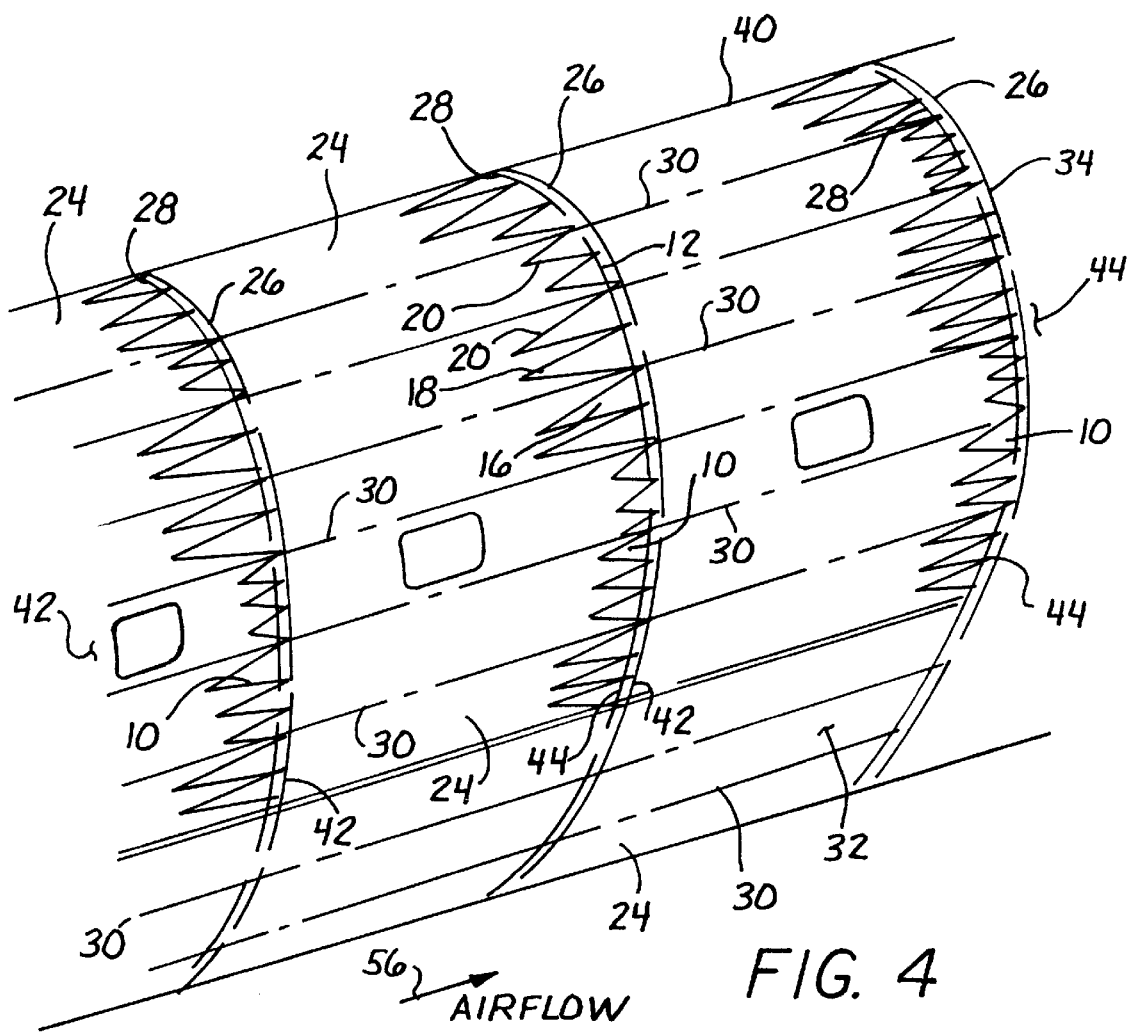
FIG. 4 is a diagrammatic view of a portion of an aircraft fuselage showing the energy absorbing wedges of the present invention.

Referring now to FIG. 4, a passive damping wedge 10 having the features of the present invention is shown incorporated into the fuselage of an aircraft 40. The aircraft fuselage 40 comprises a plurality of skin panels 24 which are bounded by a first frame member 26 and a second frame member 28. The panel 24 is also bounded on opposing surfaces by stringers or longerons 30. The fuselage 40 has an outer surface for exposure to high speed longitudinal airflow 56.

The present invention is primarily concerned with an airflow experienced while the aircraft is at cruising speeds. This is because the cruising speeds encompass the majority of the portion of the aircraft's trip. This is particularly true for commercial airlines and aircraft. The fuselage panel 24 has a first or leading end 42 and a second or trailing end 44. The fuselage panel 24 also has an inner surface 34 and an outer surface 32, the outer surface constructed for exposure to the airflow 56.

A first frame member 26 supports the inner surface 34 at the first or leading end 42. The first frame member 26 traversing the inner surface 34 generally perpendicular to the direction of the aircraft fuselage. A second frame member 28 supports the inner surface 34 at the second end 44 and is spaced apart from the first frame member 26. The second frame member 28 generally traverses the inner surface 34 parallel to the first frame member 26.

A passive damping wedge 10 is attached to the inner surface 34. The wedge 10 has an elongated base 12 which is aligned with and extends along the second frame member 28. The wedge 10 has an upper surface 16 which extends from the base 12 and tapers downwardly into a plurality of spaced apart front end members 18. Each of the front end members 18 extends along the inner surface 34 towards the first frame member 26.

The passive damping wedge 10 may be attached to the inner surface 34 using an adhesive such as a contact adhesive and may also be attached to the second frame member 28 using fasteners penetrating the second frame member 28 and attaching to the elongated base 12. Alternatively, adhesive may also be used to attach the elongated base 12 to the second frame member 28. In an alternative embodiment the passive damping wedge 10 may comprise a series of individual passive damping wedges 10. In this embodiment, the sides 20 which generally define the space apart front end members 18 extend all the way to the base 12. Thus, each of the plurality of the spaced apart front end members 18 actually comprises an individual passive damping wedge 10. These wedges 10 are preferably configured such that they are in contact along the sides 20 but may be spaced apart.

In a commercial airline, typical of that used to carry passengers, the passive damping wedges 10 are attached to the inner surface 34 along the second frame member 28. The wedge 10 may extend from a floor portion or floor longeron 46 circumferentially around the passenger cabin to the opposing floor longeron 46. In this fashion, the passive damping wedge is continuous along fuselage where the passenger compartment is. Alternatively, the passive damping wedge may be circumferential around the entire aircraft fuselage 40. The passive damping wedges 10 may also be applied toward the leading edge of any windows 48 or other structural portions attached to the aircraft fuselage 40.

While this invention has been described with respect to various examples and embodiments, it is to be understood that the invention is not limited thereto and that it can be variously practiced within the scope of the following claims.

What is claimed is:

1. A viscoelastic wedge for absorbing flexural wave energy in a panel, said wedge comprising:

an elongated base extending upwardly from a flat lower surface;

an upper surface tapering downwardly from said base into a plurality of spaced apart front end members; and a plurality of pairs of sides, each pair of sides tapering inwardly to generally define each of said front end members.

2. A wedge as recited in claim 1 wherein at least one of said plurality of front end members defines a semi-cone.

3. An apparatus for absorbing flexural wave energy in a panel having a first end supported by a first frame member and a second end supported by a second frame member, said apparatus comprising:

an elongated wedge attached to an inner surface of said panel, said wedge having a base aligned with and extending along said second frame member and tapering downwardly along an upper surface to define a plurality of spaced apart front end members, each of said members extending along said inner surface towards said first frame member.

4. An apparatus as recited in claim 1 wherein said elongated wedge is made from a viscoelastic material.

5. A vehicle for high speed travel comprising:

a fuselage panel having a first end and a second end, said panel having an inner surface and an outer surface constructed for exposure to a longitudinal fluid flow;

a first frame member supporting said inner surface at said first end, said first frame member traversing said inner surface generally perpendicular to said longitudinal fluid flow;

a second frame member supporting said inner surface at said second end, said second frame member spaced apart from said first frame member and traversing said inner surface generally parallel to said first frame member;

an elongated viscoelastic wedge attached to said inner surface, said wedge having a base aligned with and extending along said second frame member and tapering downwardly along an upper surface to define a plurality of spaced apart front end members, each of said front end members extending along said inner surface towards said first frame member.

6. A vehicle as recited in claim 5 wherein said viscoelastic wedge comprises a flexible outer shell containing a viscous liquid.

7. A vehicle as recited in claim 6 wherein said viscous liquid is a gel.

8. A vehicle as recited in claim 5 wherein at least one of said plurality of front end members extends further along said inner surface towards said first frame member than at least another of said plurality of front end members.

9. A vehicle as recited in claim 5 wherein each of said plurality of front end members extends a length along said inner surface corresponding to a vibrational energy wavelength in said panel.

10. A vehicle as recited in claim 5 wherein each of said plurality of front end members at least partially defines a semi-cone.

11. A vehicle as recited in claim 10 wherein at least some of the front end members have a rounded front end.

12. A vehicle as recited in claim 5 wherein said viscoelastic wedge extends along said second frame member around a passenger supporting portion of said fuselage.

13. An aircraft for high speed travel comprising:

a fuselage panel having a first end and a second end, said panel having an inner surface and an outer surface constructed for exposure to a longitudinal air flow;

a first frame member supporting said inner surface at said first end, said first frame member traversing said inner surface generally perpendicular to said longitudinal airflow;

a second frame member supporting said inner surface at said second end, said second frame member spaced apart from said first frame member and traversing said inner surface generally parallel to said first frame member; and a plurality of viscoelastic energy absorbing wedges, each having a base abutting and extending along said second frame member and tapering inwardly along a pair of sides into a front end, each of said wedges having an upper surface tapering downwardly from said base to said front end, said front end extending outwardly from said base towards said first frame member along said inner surface generally parallel to said longitudinal airflow.

14. An aircraft as recited in claim 13 wherein at least one of said plurality of wedges is in contact with another wedge and said contact is along at least one of said pair of sides.

15. An aircraft as recited in claim 13 wherein each of said pair of sides has a taper angle between 10 and 25 degrees.

16. An aircraft as recited in claim 13 wherein each of said pair of sides has a taper angle between approximately 17 and 19 degrees.

17. An aircraft as recited in claim 13 wherein at least one of the plurality of pairs of sides and front end defines a semi-cone.

18. An aircraft as recited in claim 13 wherein the upper surface of at least one of said plurality of wedges is convex.

19. An aircraft as recited in claim 13 wherein the upper surface of at least one of said plurality of wedges is concave.

20. An aircraft as recited in claim 13 wherein at least one of the plurality of wedges comprises a viscoelastic polymer.

\* \* \* \* \*